(12) United States Patent
Balakrishnan et al.

(10) Patent No.: US 9,756,143 B2
(45) Date of Patent: Sep. 5, 2017

(54) SYSTEM AND METHOD FOR IMPROVING VIRTUAL MEDIA REDIRECTION SPEED IN BASEBOARD MANAGEMENT CONTROLLER (BMC)

(71) Applicant: American Megatrends, Inc., Norcross, GA (US)

(72) Inventors: Venkatesan Balakrishnan, Chennai (IN); Othiyappan Kanniappan, Chennai (IN); Jothiram Selvam, Paderborn (DE)

(73) Assignee: AMERICAN MEGATRENDS, INC., Norcross, GA (US)

( * ) Notice: Subject to any disclaimer, the term of this patent is extended or adjusted under 35 U.S.C. 154(b) by 264 days.

(21) Appl. No.: 14/849,367

(22) Filed: Sep. 9, 2015

(65) Prior Publication Data
US 2017/0070590 A1    Mar. 9, 2017

(51) Int. Cl.
*H04L 29/08* (2006.01)
*G06F 12/08* (2016.01)
*G06F 3/06* (2006.01)
*G06F 12/0813* (2016.01)

(52) U.S. Cl.
CPC .......... *H04L 67/2852* (2013.01); *G06F 3/061* (2013.01); *G06F 3/067* (2013.01); *G06F 3/0631* (2013.01); *G06F 3/0664* (2013.01); *G06F 12/0813* (2013.01); *H04L 67/1097* (2013.01); *G06F 2212/1024* (2013.01); *G06F 2212/154* (2013.01); *G06F 2212/2542* (2013.01);

(Continued)

(58) Field of Classification Search
CPC ............ H04L 67/1097; H04L 67/2852; H04L 67/025; H04L 67/42; G06F 3/067; G06F 3/061; G06F 3/0631; G06F 3/0664; G06F 12/0813; G06F 2212/1024; G06F 2212/154; G06F 2212/2542; G06F 2212/50; G06F 2212/604; G06F 2212/6042
USPC ....................................................... 709/203
See application file for complete search history.

(56) References Cited

U.S. PATENT DOCUMENTS 8,510,505 B1 * 8/2013 van Reitschote . G06F 17/30233
707/610
8,874,848 B2 * 10/2014 Soundararajan .... G06F 12/0813
711/122

(Continued)

*Primary Examiner* — Ruolei Zong
(74) *Attorney, Agent, or Firm* — Locke Lord LLP; Tim Tingkang Xia, Esq.

(57) ABSTRACT

Certain aspects of the disclosure relates to a system and method of performing virtual media redirection. The system includes a baseboard management controller (BMC) connected to a host computing device through a communication interface, and a client computing device communicatively connected to the BMC through a network. In operation, the BMC emulates a virtual media for a media device, and establishes a virtual media connection to the client computing device through the network. Then the BMC stores the data from the media device in a host cache at the BMC and in a client cache at the client computing device by sectors. When the BMC receives a request from the host computing device through the communication interface to retrieve sectors from the media device, the BMC redirects the sectors being requested to the host computing device depending on where the requested sectors are stored.

26 Claims, 5 Drawing Sheets

(52) U.S. Cl.
CPC .... *G06F 2212/50* (2013.01); *G06F 2212/604* (2013.01); *G06F 2212/6042* (2013.01)

(56) References Cited

U.S. PATENT DOCUMENTS

| | | | | |
|---|---|---|---|---|
| 2007/0168498 A1* | 7/2007 | Lambert | ................. | H04L 67/38 709/224 |
| 2009/0013056 A1* | 1/2009 | Weinstock | ............ | G06F 3/1462 709/208 |
| 2011/0093575 A1* | 4/2011 | Dube | ...................... | G06F 15/16 709/223 |
| 2014/0280756 A1* | 9/2014 | Maity | ..................... | H04L 67/06 709/219 |
| 2015/0163282 A1* | 6/2015 | Siegman | ............... | G06F 3/0605 709/208 |
| 2016/0321291 A1* | 11/2016 | Malhotra | .......... | G06F 17/30233 |

* cited by examiner

SYSTEM AND METHOD FOR IMPROVING VIRTUAL MEDIA REDIRECTION SPEED IN BASEBOARD MANAGEMENT CONTROLLER (BMC)

FIELD

The present disclosure relates generally to virtual desktop infrastructure (VDI) technology, and particularly to system and methods to improve the virtual media redirection speed in a baseboard management controller (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, in a system performing virtual media redirection, the speed of retrieving media files from media devices such as CD/DVD is critical to the performance of the virtual media redirection. Specifically, virtual media may be emulated through a universal serial bus (USB) interface. The virtual media is exposed as floppy drive, USB flash drive, USB hard drive (HDD), USB CD-ROM/DVD-ROM drive to the host operating system (OS). The virtual media files are transmitted from a host computer to client computing devices using USB small computer system interface (SCSI) packets and encapsulated by a proprietary envelop. Due to slow speed of reading media device, packaging and encapsulation at both the host computer and the client computing devices, and a round trip delay, virtual media redirection according to this conventional method is slow.

Therefore, an unaddressed need exists in the art to address the aforementioned deficiencies and inadequacies.

SUMMARY

Certain aspects of the present disclosure direct to a system, which includes a host computing device, a baseboard management controller (BMC) communicatively connected to the host computing device through a communication interface, and a client computing device communicatively connected to the BMC through a network. The BMC has a processor and a non-volatile memory, and the non-volatile memory stores a virtual media redirection module. The client computing device has a memory. In certain embodiments, the virtual media redirection module, when executed at the processor of the BMC, is configured to: emulate a virtual media for a media device, wherein the media device stores data of one or more media files; establish a virtual media connection to the client computing device through the network, wherein a client cache is created at the memory of the client computing device; store the data from the media device in a host cache by sectors; instruct the client computing device to store the data from the media device in the client cache by sectors; receive a request from the host computing device through the communication interface to retrieve one or more sectors from the media device; and in response to the request, perform a virtual media redirection to redirect the sectors being requested to the host computing device. In certain embodiments, the virtual media redirection includes: performing a local virtual media redirection when one or more of the sectors being requested are stored in the host cache; and performing a remote virtual media redirection when one or more of the sectors being requested are stored in the client cache.

In certain embodiments, the communication interface is a universal serial bus (USB) interface.

In certain embodiments, the virtual media redirection module, when executed at the processor of the BMC, is configured to store the data from the media device in the host cache by sectors by: retrieving the sectors of the data from the media device; and storing the retrieved sectors in the host cache until the host cache is full. In certain embodiments, the retrieved sectors from the media device comprises frequently requested sectors.

In certain embodiments, the virtual media redirection module, when executed at the processor of the BMC, is configured to store the data from the media device in the host cache by sectors when the BMC is idling.

In certain embodiments, the virtual media redirection module, when executed at the processor of the BMC, is configured to instruct the client computing device to store the data from the media device in the client cache by sectors by: instructing the client computing device to retrieve the sectors of the data from the media device; and instructing the client computing device to store the retrieved sectors in the client cache until the client cache is full. In certain embodiments, the retrieved sectors from the media device comprises frequently requested sectors.

In certain embodiments, the host computing device is configured to: receive a command to retrieve one or more of the media files from the media device; determine the sectors corresponding to the one or more of the media files to be retrieved; and generate the request to retrieve the sectors, and send the request to the BMC.

In certain embodiments, the virtual media redirection module, when executed at the processor of the BMC, is configured to perform the local virtual media redirection by: determining, at the BMC, whether any of the sectors being requested is stored in the host cache; in response to determining that one or more of the sectors being requested are stored in the host cache, transmitting the one or more of the sectors being requested from the host cache to the host computing device; and marking the one or more of the sectors being transmitted in the host cache as used sectors. In certain embodiments, the virtual media redirection module, when executed at the processor of the BMC, is further configured to: discard the used sectors in the host cache; and store the data from the media device in the host cache by sectors until the host cache is full.

In certain embodiments, the virtual media redirection module, when executed at the processor of the BMC, is configured to perform the remote virtual media redirection by: determining, at the BMC, whether any of the sectors being requested is stored in the client cache; in response to determining that one or more of the sectors being requested are stored in the client cache, instructing the client computing device to transmit the one or more of the sectors being requested from the client cache to the BMC through the network; and receiving the sectors being transmitted from the client computing device, and sending the sectors received to the host computing device; where the client computing device is configured to mark the one or more of the sectors being transmitted in the client cache as used sectors. In certain embodiments, the virtual media redirection module, when executed at the processor of the BMC, is further configured to instruct the client computing device to:

discard the used sectors in the client cache; and store the data from the media device in the client cache by sectors until the client cache is full.

Certain aspects of the present disclosure direct to a method of performing virtual media redirection. In certain embodiments, the method includes: emulating, by a BMC, a virtual media for a media device, wherein the media device stores data of one or more media files; establishing, by the BMC, a virtual media connection to a client computing device through a network, wherein the client computing device is communicatively connected to the BMC through the network, and a client cache is created at a memory of the client computing device; storing, at the BMC, the data from the media device in a host cache by sectors; instructing, by the BMC, the client computing device to store the data from the media device in the client cache by sectors; receiving, at the BMC, a request from a host computing device through a communication interface to retrieve one or more sectors from the media device; and in response to the request, performing, at the BMC, a virtual media redirection to redirect the sectors being requested to the host computing device, where the virtual media redirection includes: performing a local virtual media redirection when one or more of the sectors being requested are stored in the host cache; and performing a remote virtual media redirection when one or more of the sectors being requested are stored in the client cache.

In certain embodiments, the communication interface is a USB interface.

In certain embodiments, the BMC is configured to store the data from the media device in the host cache by sectors by: retrieving the sectors of the data from the media device; and storing the retrieved sectors in the host cache until the host cache is full, where the retrieved sectors from the media device comprises frequently requested sectors.

In certain embodiments, the BMC is configured to store the data from the media device in the host cache by sectors when the BMC is idling.

In certain embodiments, the BMC is configured to instruct the client computing device to store the data from the media device in the client cache by sectors by: instructing the client computing device to retrieve the sectors of the data from the media device; and instructing the client computing device to store the retrieved sectors in the client cache until the client cache is full, where the retrieved sectors from the media device comprises frequently requested sectors.

In certain embodiments, the local virtual media redirection is performed by: determining, at the BMC, whether any of the sectors being requested is stored in the host cache; in response to determining that one or more of the sectors being requested are stored in the host cache, transmitting the one or more of the sectors being requested from the host cache to the host computing device; marking the one or more of the sectors being transmitted in the host cache as used sectors; discarding the used sectors in the host cache; and storing the data from the media device in the host cache by sectors until the host cache is full.

In certain embodiments, the remote virtual media redirection is performed by: determining, at the BMC, whether any of the sectors being requested is stored in the client cache; in response to determining that one or more of the sectors being requested are stored in the client cache, instructing the client computing device to transmit the one or more of the sectors being requested from the client cache to the BMC through the network; receiving the sectors being transmitted from the client computing device, and sending the sectors received to the host computing device, wherein the client computing device is configured to mark the one or more of the sectors being transmitted in the client cache as used sectors; instructing the client computing device to discard the used sectors in the client cache; and instructing the client computing device to store the data from the media device in the client cache by sectors until the client cache is full.

Certain aspects of the present disclosure direct to a non-transitory computer storage medium having computer-executable code stored thereon. The computer-executable code, when executed by a processor of a baseboard management controller (BMC), causes the processor to: emulate a virtual media for a media device, wherein the media device stores data of one or more media files; establish a virtual media connection to a client computing device through a network, wherein the client computing device is communicatively connected to the BMC through the network, and a client cache is created at the memory of the client computing device; store the data from the media device in a host cache by sectors; instruct the client computing device to store the data from the media device in the client cache by sectors; receive a request from a host computing device through a communication interface to retrieve one or more sectors from the media device; and in response to the request, perform a virtual media redirection to redirect the sectors being requested to the host computing device, wherein the virtual media redirection includes: performing a local virtual media redirection when one or more of the sectors being requested are stored in the host cache; and performing a remote virtual media redirection when one or more of the sectors being requested are stored in the client cache.

In certain embodiments, the communication interface is a USB interface.

In certain embodiments, the computer-executable code, when executed by the processor, causes the processor to store the data from the media device in the host cache by sectors by: retrieving the sectors of the data from the media device; and storing the retrieved sectors in the host cache until the host cache is full, where the retrieved sectors from the media device comprises frequently requested sectors.

In certain embodiments, the computer-executable code, when executed by the processor, causes the processor to store the data from the media device in the host cache by sectors when the BMC is idling.

In certain embodiments, the computer-executable code, when executed by the processor, causes the processor to instruct the client computing device to store the data from the media device in the client cache by sectors by: instructing the client computing device to retrieve the sectors of the data from the media device; and instructing the client computing device to store the retrieved sectors in the client cache until the client cache is full, where the retrieved sectors from the media device comprises frequently requested sectors.

In certain embodiments, the computer-executable code, when executed by the processor, causes the processor to perform the local virtual media redirection by: determining, at the BMC, whether any of the sectors being requested is stored in the host cache; in response to determining that one or more of the sectors being requested are stored in the host cache, transmitting the one or more of the sectors being requested from the host cache to the host computing device; marking the one or more of the sectors being transmitted in the host cache as used sectors; discarding the used sectors in the host cache; and storing the data from the media device in the host cache by sectors until the host cache is full.

In certain embodiments, the computer-executable code, when executed by the processor, causes the processor to perform the remote virtual media redirection by: determining, at the BMC, whether any of the sectors being requested is stored in the client cache; in response to determining that one or more of the sectors being requested are stored in the client cache, instructing the client computing device to transmit the one or more of the sectors being requested from the client cache to the BMC through the network; receiving the sectors being transmitted from the client computing device, and sending the sectors received to the host computing device, wherein the client computing device is configured to mark the one or more of the sectors being transmitted in the client cache as used sectors; instructing the client computing device to discard the used sectors in the client cache; and instructing the client computing device to store the data from the media device in the client cache by sectors until the client cache is full.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
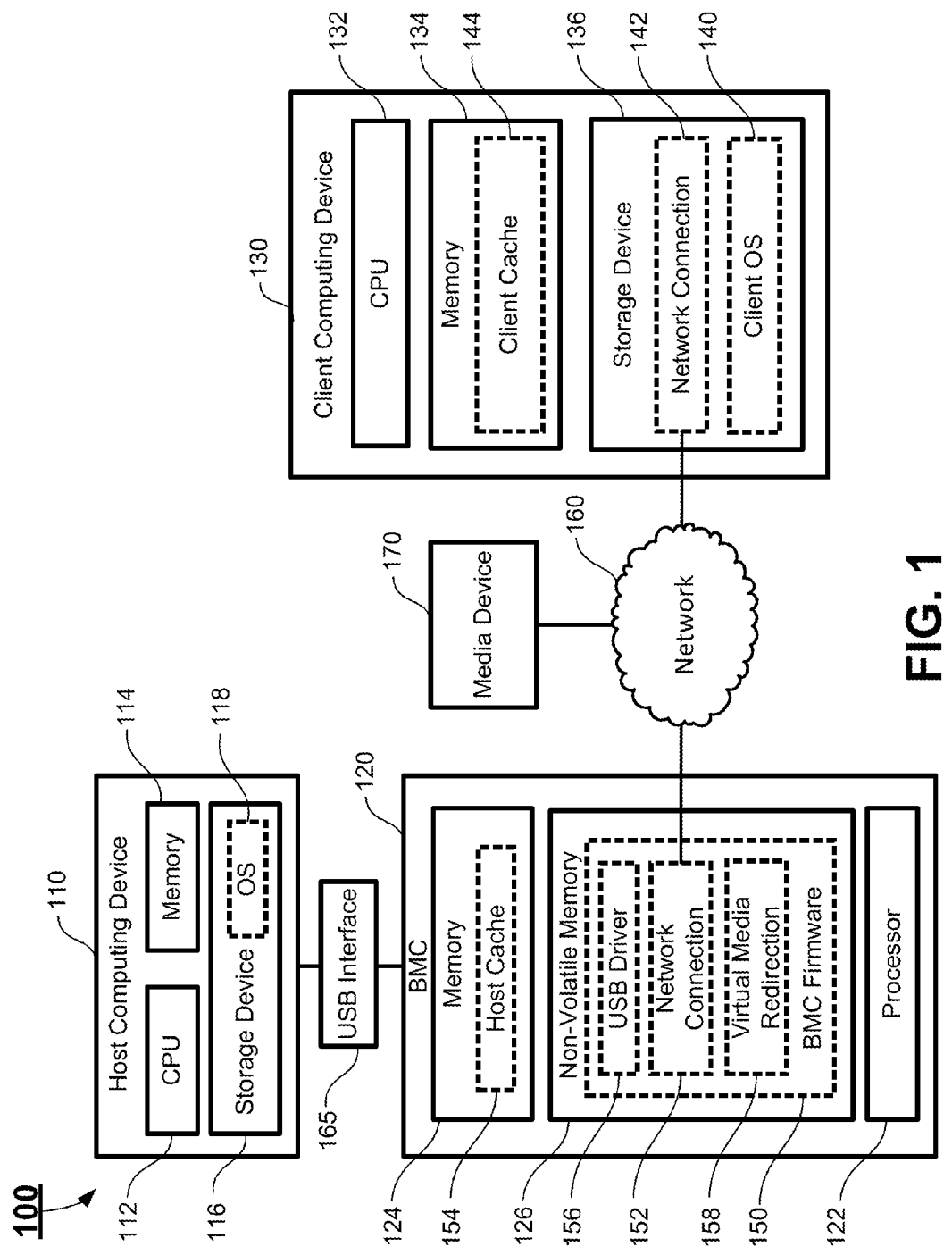
FIG. 1 schematically depicts an exemplary virtual media redirection system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing may be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" may be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "server" generally refers to a system that responds to requests across a computer network to provide, or help to provide, a network service. An implementation of the server may include software and suitable computer hardware. A server may run on a computing device or a network computer. In some cases, a computer may provide several services and have multiple servers running.

As used herein, the term "hypervisor" generally refers to a piece of computer software, firmware or hardware that creates and runs virtual machines. The hypervisor is sometimes referred to as a virtual machine manager (VMM).

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

The systems and methods described herein may be implemented by one or more computer programs executed by one or more processors. The computer programs include processor-executable codes or instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, when the BMC emulates a virtual media to the host, the BMC will receive the USB SCSI packets, and the same is encapsulated by the proprietary envelop and sent to the virtual media client. The virtual media client will remove the envelop and interpret the USB SCSI request, and based on the request, the virtual media client will read the appropriate sector on the redirected virtual media. The data read from the media will be sent back to the BMC using the proprietary protocol. Upon receiving the data, the BMC will again remove the envelop and present the information to the host through the USB interface. Thus, for every request for the sectors, there will be a round trip delay.

To improve the virtual media redirection performance, aspects of the present disclosure utilizes cache technology, such that the BMC may cache the sectors based on the criteria. For example, the caching can be done for frequently requested sectors, and may be done when the BMC is idling. Thus, the BMC may perform the read-ahead of sectors. This caching will increase the redirection speed, and thus may avoid the round trip delay. Similarly, at the virtual media client side, the caching may also be performed. The client may perform read-ahead of the sectors, and keep the sectors in the memory. Thus, when the BMC requests for the sectors, the client may serve the requested sectors from the cache memory instead of going to the media device.

In one aspect, the present disclosure relates to a virtual media redirection system. FIG. 1 shows a virtual media redirection system 100 according to certain embodiments of the present disclosure. As shown in FIG. 1, the virtual media redirection system 100 includes a host computing device 110, a BMC 120, and one or more client computing devices 130. Further, a network 160 is communicatively connecting the BMC 120 and the one or more client computing devices 130, and a USB interface 165 is communicatively connecting the BMC 120 to the host computing device 110. A media device 170 is also connected to the network 160. In certain embodiments, the network 160 may be a wired or wireless network, and may be of various forms, such as a public network and a private network. Examples of the network 160 may include, but not limited to, a local area network (LAN) or a wide area network (WAN) including the Internet. In certain embodiments, two or more different networks and/or interfaces may be applied to connect the BMC 120 to the remote computing devices 130.

The USB interface 165 is the communication interface between the BMC 120 and the host computing device 110. Specifically, the USB interface 165 a standardized interface under the USB industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. The USB interface 165 has become commonplace on other devices, such as smartphones, PDAs and video game consoles. USB has effectively replaced a variety of earlier interfaces, such as serial and parallel ports, as well as separate power chargers for portable devices. Currently, USB allows bi-directional communications between the computing devices and the USB devices, as USB 3.0 allows for device-initiated communications towards the host. Thus, when the BMC 120 emulates a virtual media, the virtual media may be exposed to the OS 180 of the host computing device 110 as a USB device, such as a USB floppy drive, USB thumb drive, USB hard drive, USB CD-ROM/DVD-ROM drive, or other USB storage devices.

The media device 170 is a storage device which provides data of one or more media files to be retrieved by the host computing device 110. Specifically, the media device 170 may be a non-volatile storage device, such as a hard drive, a CD-ROM drive, a DVD-ROM drive or a solid state storage device, or may be a storage server including one or more storage devices. The location of the media device 170 in the system 100 may vary. For example, the media device 170 may be an external storage device of the client computing device 130, or may be an external storage device of the BMC 120. In certain embodiments, the media device 170 may be a network storage device independent from, without being directly connected to, any of the host computing device 110, the BMC 120 and/or the client computing device 130. In certain embodiments, the media device 170 may be implemented by multiple storage devices and/or storage servers distributed at different locations of the system 100. Examples of the media device 170 may include, without being limited to, flash memory, memory cards, USB drives, hard drives, floppy disks, optical drives, or any other types of data storage devices.

In certain embodiments, the media device 170 contains one or more ISO images storing the media files. The ISO image is an archive file of an optical disc, and it is a type of disk image composed of the data contents from every written sector on an optical disk, including its optical disk file system. In addition to storing various media files, the media device 116 may also store other necessary software applications.

The host computing device 110 functions as a host computer for the BMC 120. In certain embodiments, the host computing device 110 may be a desktop computer, a laptop computer, a tablet, a server, or other network connected computing device. In certain embodiments, the host computing device 110 includes a central processing unit (CPU) 112, a memory 114, and a storage device 116. In certain embodiments, the host computing device 110 may include other hardware and/or software components necessary for the operation of the host computing device 110, such as one or more I/O devices (not shown) and interfaces for generating and controlling input and output signals of the host computing device 110. Examples of the I/O device include keyboards, touch pads, mouse, microphones, display screens, touch screens, or other I/O devices applicable for the host computing device 110. Some I/O devices, such as touch screens, are provided for the dual input/output purpose.

In certain embodiments, the CPU 112 is a processor configured to control operation of the host computing device 110. The CPU 112 runs the operating system on the host computing device 110 and other applications of the host computing device 110. In certain embodiments, the host computing device 110 may run on or more than one CPU as the host processor, such as two CPUs, four CPUs, eight CPUs, or any suitable number of CPUs.

In certain embodiments, the memory 114 may be a volatile memory, such as the random-access memory (RAM), for storing the data and information during the operation of the host computing device 110. In certain embodiments, the memory 114 is in communication with the CPU 112 through a system bus.

The storage device 116 is a non-volatile storage for storing an OS 118 and other software applications for the host computing device 110. Examples of the storage device 116 may include, without being limited to, flash memory, memory cards, USB drives, hard drives, floppy disks, optical drives, or any other types of data storage devices. In certain embodiments, the host computing device 110 may include multiple storage devices 116.

The OS 118 may be collective management software managing the operation of the host computing device 110. For example, the OS 118 may include a set of functional programs that control and manage operations of the devices connected to the host computing device 110. The set of application programs provide certain utility software for the user to manage the host computing device 110. In certain embodiments, the operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, when the OS 118 of the host computing device 110 is configured to retrieve data of the media files from the media device 170, the OS 118 will communicate with the BMC 120 through the USB interface 165, and the BMC 120 may perform a virtual media redirection for the media device 170 such that the host computing device 110 may receive the requested data. Specifically, as discussed above, the media device 170 may contain an ISO image storing the media files. In certain embodiments, when the OS 118 of the host computing device 110 receives a command to retrieve one or more of the media files from the media device 170, the OS 118 may check the file system of the ISO image, and determine the sectors corresponding to the media files to be retrieved from the ISO image. Then the OS 118 generates a request to retrieve the sectors, and sends the request to the BMC 120. In response to the request, the BMC 120 performs the virtual media redirection to serve the requested sectors to the host computing device 110 such that the OS 118 may obtain the sectors.

The BMC 120 is a specialized management controller that manages the interface between system management software and platform hardware of the host computing device 110. In certain embodiments, the BMC 120 may be implemented by a system on chip (SoC), such as a service processor (SP), or by other management controllers. Different types of sensors can be built into the host computing device 110, and the BMC 120 reads these sensors to obtain parameters such as temperature, cooling fan speeds, power status, OS status, etc.

In certain embodiment, the BMC 120 may include necessary hardware and software components to perform certain predetermined tasks. For example, as shown in FIG. 1, the BMC 120 has a processor 122, a memory 124 and a non-volatile memory 126. Further, the BMC 120 may include other hardware components and software components (not shown) to perform its corresponding tasks. Examples of these hardware and software components may include, but not limited to, other required memory, interfaces, buses, I/O modules and peripheral devices.

The processor 122 is configured to control operation of the BMC 120. In certain embodiments, the processor 122 may be a central processing unit (CPU). The processor 122 can execute any computer executable code or instructions, such as the BMC firmware 150 of the server management device 110 or other applications and instructions of the management device 110. In certain embodiments, the management device 110 may run on more than one processor, such as two processors, four processors, eight processors, or any suitable number of processors.

The memory 124 may be a volatile memory, such as the RAM, for storing the data and information during the operation of the BMC 120. When the BMC 120 is powered off, the data or information in the memory 124 will be lost.

In certain embodiments, the memory 124 stores a host cache 154. The host cache 154 is configured to store sectors of data from a media device 170 to speed up the virtual media redirection. Specifically, the media device 170 may store an ISO image, which contains one or more media files, and the host cache 154 is may store or "cache" the data from the media device 170 by sectors. In certain embodiments, the caching of the sectors in the host cache 154 may be performed when the BMC 120 is idling. In this way, the sectors stored in the host cache 154 may be retrievable by the host computing device 110 to increase redirection speed, thus avoiding the round trip delay.

The non-volatile memory 126 is a non-volatile data storage media for storing the applications of the BMC 120. Examples of the non-volatile memory 126 may include non-volatile memory modules such as flash memory, memory cards, USB drives, hard drives, floppy disks, optical drives, or any other types of data storage devices. In certain embodiments, the BMC 120 may have multiple non-volatile memory 126 or other storage devices, which may be identical storage devices or different types of storage devices, for storing the modules of the BMC 120.

As shown in FIG. 1, the non-volatile memory 126 of the BMC 120 stores a BMC firmware 150, which includes a network connection module 152, a USB driver 156, and a virtual media redirection module 158. In certain embodiments, the network connection module 152 and the USB driver 156 may be a part of the BMC firmware 150, or may be a separate module from the BMC firmware 150. In certain embodiments, the BMC firmware 150 may store other applications necessary for the operation of the BMC 120. It should be noted that all of the modules of the BMC firmware 150 are each implemented by computer executable codes or instructions, which collectively forms the BMC firmware 150. In certain embodiments, each of the modules may further include sub-modules. Alternatively, some of the modules may be combined as one stack.

The network communication module 152 supports network connection over the network 160 between the BMC 120 and the client computing device 130. By establishing the network connection between the BMC 120 and the client computing device 130, the BMC 120 may serve as a virtual media server, and the client computing device 130 may serve as a virtual media client.

The USB driver 156 is a driver module to allow the BMC 120 to communicate with the host computing device 110 through the USB interface 165. In certain embodiments, the BMC 120 may use the USB drive to communicate with the host computing device 110, and/or with other computing devices of the system 100, through the USB interface 165. The host computing 110 may write data to and read data from the USB driver 156 using standard USB storage device commands. Therefore, the host computing 110 perceives the BMC 120 as a typical USB drive.

The virtual media redirection module 158 is a module to perform virtual media redirection for the host computing device 110. In certain embodiments, the virtual media redirection module 158, when executed, is configured to emulate a virtual media for the media device 170. The virtual media redirection module 158 may establish a virtual media connection to the client computing device 130 through the network 160. Then, the virtual media redirection module 158 may store the data from the media device 170 in the host cache 154 of the memory 124 by sectors, and instruct the client computing device 130 to store the data from the media device 170 in the client cache 144 by sectors. Once the host cache 154 and the client cache 144 are filled, the virtual media redirection module 158 may wait for the host computing device 110 to request for the sectors. When the virtual media redirection module 158 receives a request from the host computing device 110 through the USB interface 165 to retrieve one or more sectors from the media device 170, the virtual media redirection module 158 may, in response to the request, perform a virtual media redirection to redirect the sectors being requested to the host computing device 110. Specifically, since the sectors of data may be cached or stored in the host cache 154 and the client cache 144, the virtual media redirection may include two different parts. When one or more of the sectors being requested are stored in the host cache 154, the virtual media redirection module 158 may perform a local virtual media redirection. When one or more of the sectors being requested are stored in the client cache 144, the virtual media redirection module 158 may perform a remote virtual media redirection. Details of the virtual media redirection may be described hereinafter in details.

The client computing device 130 is a remote computing device being communicatively connected to the BMC 120 through the network 160. In certain embodiments, the client computing device 130 may be a desktop computer, a laptop computer, a zero/thin client device, a tablet computing device, or a smart phone. Although throughout the present disclosure, one client computing device 130 is discussed, the client computing device 130 may be more than one computing devices.

In certain embodiments, the client computing device 130 includes a CPU 132, a memory 134, and a storage device 136. In certain embodiments, the client computing device 130 may include other hardware and/or software components necessary for the operation of the client computing device 130, such as one or more I/O devices (not shown) and interfaces for generating and controlling input and output signals of the client computing device 130. Examples of the I/O device include keyboards, touch pads, mouse, microphones, display screens, touch screens, or other I/O devices applicable for the client computing device 130. Some I/O devices, such as touch screens, are provided for the dual input/output purpose.

In certain embodiments, the CPU 132 is a processor configured to control operation of the client computing device 130. The CPU 132 runs the operating system on the client computing device 130 and other applications of the client computing device 130. In certain embodiments, the client computing device 130 may run on or more than one CPU as the processor, such as two CPUs, four CPUs, eight CPUs, or any suitable number of CPUs.

In certain embodiments, the memory 134 may be a volatile memory, such as the random-access memory (RAM), for storing the data and information during the operation of the client computing device 130. In certain embodiments, the memory 134 is in communication with the CPU 132 through a system bus.

In certain embodiments, the memory 134 stores a client cache 144. The client cache 154 is configured to store sectors of data from the media device 170 to speed up the virtual media redirection. Specifically, the media device 170 may store an ISO image, which contains one or more media files, and the client cache 144 is may store or "cache" the data from the media device 170 by sectors at the client computing device 130. In this way, the sectors stored in the client cache 144 at the client computing device 130 may be retrievable by the host computing device 110 through the network connection between the BMC 120 and the client computing device 130 without the round trip delay, thus increasing redirection speed.

The storage device 136 is a non-volatile storage for storing an OS 140, a network connection module 142 and other software applications for the client computing device 130. Examples of the storage device 136 may include, without being limited to, flash memory, memory cards, USB drives, hard drives, floppy disks, optical drives, or any other types of data storage devices. In certain embodiments, the client computing device 130 may include multiple storage devices 136.

The OS 140 may be collective management software managing the operation of the client computing device 130. For example, the OS 140 may include a set of functional programs that control and manage operations of the devices connected to the client computing device 130. The set of application programs provide certain utility software for the user to manage the client computing device 130. In certain embodiments, the operating system is operable to multitask, i.e., execute computing tasks in multiple threads.

The network communication module 142 is a corresponding module to the network communication module 152 at the BMC 120 to support network connection over the network 160 between the BMC 120 and the client computing device 130. By establishing the network connection between the BMC 120 and the client computing device 130, the BMC 120 may serve as a virtual media server, and the client computing device 130 may serve as a virtual media client.

As discussed above, the host cache 154 and the client cache 144 are used in the virtual media redirection system 100 to cache the sectors from the media device 170 in order to speed up the virtual media redirection. Based on the sizes of the host cache 154 and the client cache 144, they are used to store as many sectors as possible.

Figure 2:
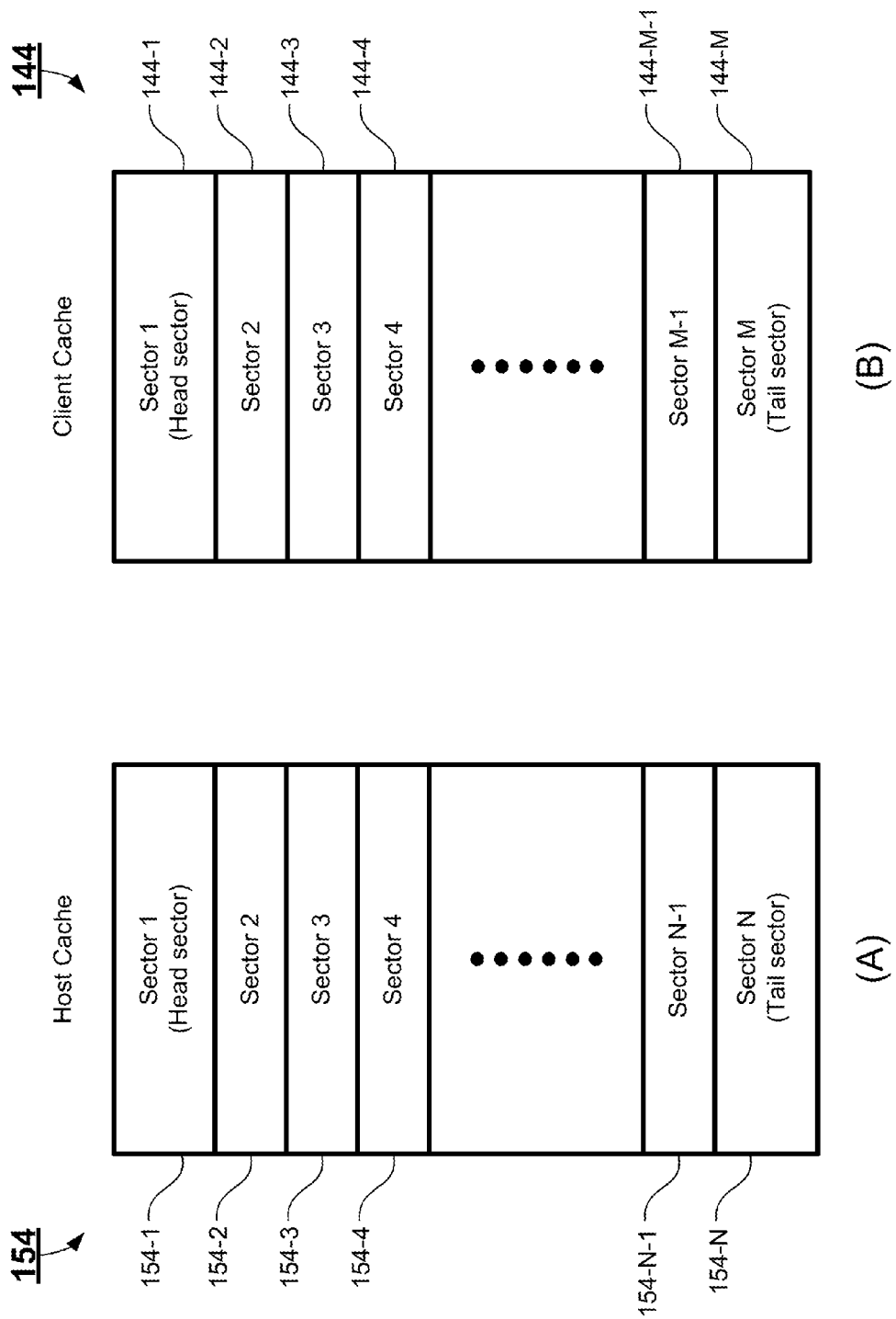
FIG. 2 schematically depicts configurations of a host cache (A) and a client cache (B) of according to certain embodiments of the present disclosure.

FIG. 2 schematically depicts configurations of a host cache (A) and a client cache (B) of according to one embodiment of the present disclosure. As shown in FIG. 2, a host cache 154 is shown in the left portion (A) of the drawing, and a client cache 144 is shown in the right portion (B) of the drawing. In certain embodiments, the host cache 154 has N sectors, and the client cache 144 has M sectors. The host cache 154 has a head sector of the queue: sector 1, and a tail sector of the queue: sector N. The client cache 144 has a head sector of the queue: sector 1, and a tail sector of the queue: sector M. It should be noted that the sizes of the host cache 154 and the client cache may be the same or may be different. In other words, N and M may be the same integer, or may be different integers.

In certain embodiments, the virtual media redirection module 158 may store the data from the media device 170 in the host cache 154 by sectors by retrieving the sectors of the data from the media device 170, and storing the retrieved sectors in the host cache 154 until the host cache 154 is full. For example, the data may be stored in the host cache 154 from the head sector of the queue (sector 1) to the tail sector of the queue (sector N). When all of the N sectors of the host cache 154 are filled with data, the host cache 154 is full. In certain embodiments, the virtual media redirection module 158 may store the data from the media device 170 in the host cache 154 by sectors when the BMC 120 is idling, such that the BMC 120 may read ahead of sectors of the data from the media device 170.

Similarly, in certain embodiments, the virtual media redirection module 158 may instruct the client computing device 130 to store the data from the media device 170 in the client cache 144 by sectors by instructing the client computing device 130 to retrieve the sectors of the data from the media device 170, and instructing the client computing device 130 to store the retrieved sectors in the client cache 144 until the client cache 144 is full. For example, the data may be stored in the client cache 144 from the head sector of the queue (sector 1) to the tail sector of the queue (sector M). When all of the M sectors of the client cache 144 are filled with data, the client cache 144 is full.

In certain embodiments, data caching in the host cache 154 and the client cache 144 may be performed based on the frequency of the sectors being requested. For example, when certain sectors of data from the media device 170 are more frequently requested, these sectors should be prioritized to be cached in the host cache 154 and the client cache 144. In other words, when the virtual media redirection module 158 performs caching of the data in the host cache 154 and the client cache 144, the virtual media redirection module 158 may retrieve frequently requested sectors from the media device 170 and cache these frequently requested sectors in the host cache 154 and the client cache 144.

It should be particularly noted that, although the data stored in the media device 170 includes one or more media files, the data are cached in the host cache 154 and/or the client cache 144 by sectors. In other words, the caching mechanism recognize the data being cached in the host cache 154 and/or the client cache 144 by sectors, and not by the media files. In contrast, the OS 118 of the host computing device 110 may recognize the data stored in the media device 170 by files. Thus, to retrieve the media files, the OS 118 may determine the sectors corresponding to the media files to be retrieved, and then generate a request to retrieve the sectors, such that the virtual media redirection module 158 at the BMC 120 may recognize the sectors to be requested based on the request.

As described above, the virtual media redirection may include a local virtual media redirection and a remote virtual media redirection. In certain embodiments, the virtual media redirection module 158, when executed, is configured to perform the local virtual media redirection by determining, at the BMC 120, whether any of the sectors being requested is stored in the host cache 154. When the virtual media redirection module 158 determines that one or more of the sectors being requested are stored in the host cache 154, the virtual media redirection module 158 retrieves the sectors being requested from the host cache 154, and transmits the sectors being requested from the host cache 154 to the host computing device 110. Meanwhile, the virtual media redirection module 158 marks the sectors being transmitted in the host cache 154 as used sectors. In certain embodiments, after marking the sectors being transmitted in the host cache 154 as used sectors, the virtual media redirection module 158 may then discard the used sectors in the host cache 154, and store the data from the media device 170 in the host cache 154 by sectors until the host cache 154 is full. In this way, new sectors may be cached in the host cache 154 for later redirection use.

Similarly, in certain embodiments, the virtual media redirection module 158, when executed, is configured to perform the remote virtual media redirection by determining, at the BMC, whether any of the sectors being requested is stored in the client cache 144 at the client computing device. When the virtual media redirection module 158 determines that one or more of the sectors being requested are stored in the client cache 144, the virtual media redirection module 158 may instruct the client computing device 130 to retrieve the sectors being requested from the client cache 144, and transmit the sectors being requested to the BMC 120 through the network 160. Once the BMC 120 receives the sectors being transmitted from the client computing device 130, the virtual media redirection module 158 sends the sectors received to the host computing device 110. Meanwhile, at the client computing device 130, the sectors being transmitted in the client cache 144 will also be marked as used sectors. In certain embodiments, after the sectors being transmitted in the client cache 144 are marked as used sectors, the virtual media redirection module 158 may then instruct the client computing device 130 to discard the used sectors in the client cache 144, and store the data from the media device 170 in the client cache 144 by sectors until the client cache 144 is full. In this way, new sectors may be cached in the client cache 144 for later redirection use.

Figure 3:
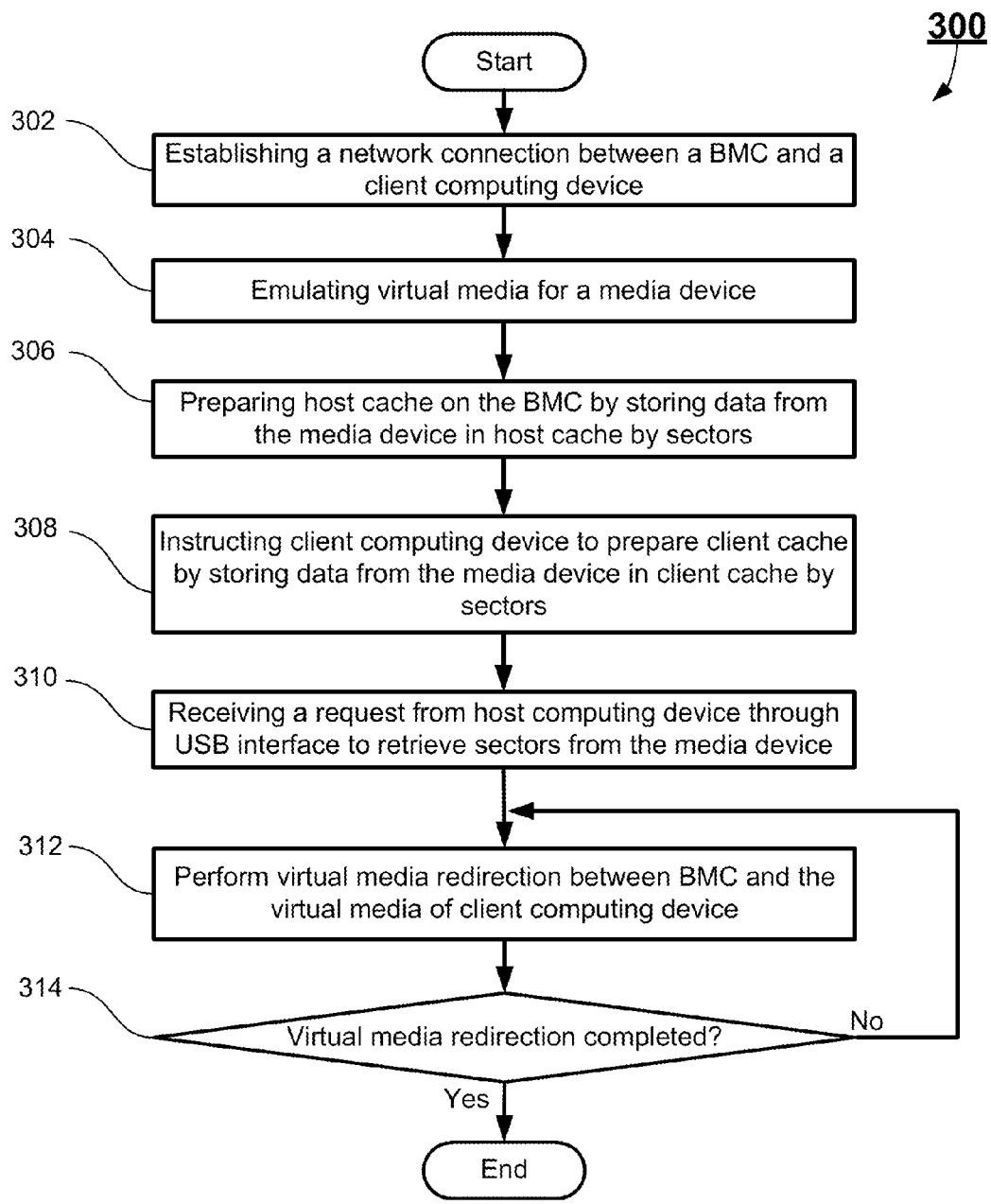
FIG. 3 depicts a flowchart of a method of performing virtual media redirection according to certain embodiments of the present disclosure.

In another aspect, the present disclosure relates to a method of performing virtual media redirection. FIG. 3 depicts a flowchart 300 of a method of performing virtual media redirection according to certain embodiments of the present disclosure. In certain embodiments, the method may be performed in the system 100 as shown in FIG. 1. It should be noted that, although the flowchart shows the operation steps in a particular sequential order, it merely provides certain embodiments of the method. In certain embodiments, unless indicated otherwise in the present disclosure, the steps of the method may be implemented in any sequential orders.

At operation 302, the BMC 120 establishes a network connection between the BMC 120 and the client computing device 130 over a network 160. This operation may be implemented by the BMC 120 sending a network connection request from the network connection module 152 of the BMC 120 and the network connection module 142 of the client computing device 130 over the network 160, and receiving a network connection response from the network connection module 142 of the client computing device 130 in response to establish the network connection.

At operation 304, the virtual media redirection module 158 of the BMC 120 emulates a virtual media for the media device 170. It should be noted that the location of the media device 170 in the system 100 may vary. For example, the media device 170 may be an external storage device of the client computing device 130, or may be an external storage device of the BMC 120. In certain embodiments, the media device 170 may be a network storage device independent from, without being directly connected to, any of the host computing device 110, the BMC 120 and/or the client computing device 130. In certain embodiments, the media device 170 may be implemented by multiple storage devices and/or storage servers distributed at different locations of the system 100. Examples of the media device 170 may include, without being limited to, flash memory, memory cards, USB drives, hard drives, floppy disks, optical drives, or any other types of data storage devices.

At operation 306, the virtual media redirection module 158 of the BMC 120 prepares the host cache 154 for virtual media redirection by storing data from the media device 170 in the host cache 154 by sectors. In certain embodiments, the virtual media redirection module 158 may store the data from the media device 170 in the host cache 154 by sectors by retrieving the sectors of the data from the media device 170, and storing the retrieved sectors in the host cache 154 until the host cache 154 is full.

At operation 308, the virtual media redirection module 158 of the BMC 120 instructs the client computing device 130 to prepare the client cache 144 for virtual media redirection by storing the data from the media device 170 in the client cache 144 by sectors. In certain embodiments, the virtual media redirection module 158 may instruct the client computing device 130 to store the data from the media device 170 in the client cache 144 by sectors by instructing the client computing device 130 to retrieve the sectors of the data from the media device 170, and instructing the client computing device 130 to store the retrieved sectors in the client cache 144 until the client cache 144 is full.

At operation 310, the virtual media redirection module 158 of the BMC 120 receives a request from the host computing device 110 through the USB interface 165 to retrieve sectors from the media device 170. Specifically, in certain embodiments, the OS 118 of the host computing device 110 may receive a command to retrieve one or more of the media files from the media device 170. Then, the OS 118 may determine the sectors corresponding to the one or more of the media files to be retrieved. Based on the determination of the sectors, the OS 118 may then generate the request to retrieve the sectors, and send the request to the BMC 120.

At operation 312, the BMC 120 performs virtual media redirection to redirect the sectors being requested to the host computing device 110. Details of the operation 312 will be described later.

At operation 314, the BMC 120 checks whether the virtual media redirection has completed. When the BMC 120 determines that the virtual media redirection has completed, the BMC 120, terminates the virtual media redirection, and exits the virtual media redirection program. When the BMC 120 determines that the virtual media redirection is to be continued, the virtual media redirection program returns to operation 312 to wait for another request for virtual media redirection.

Figure 4:
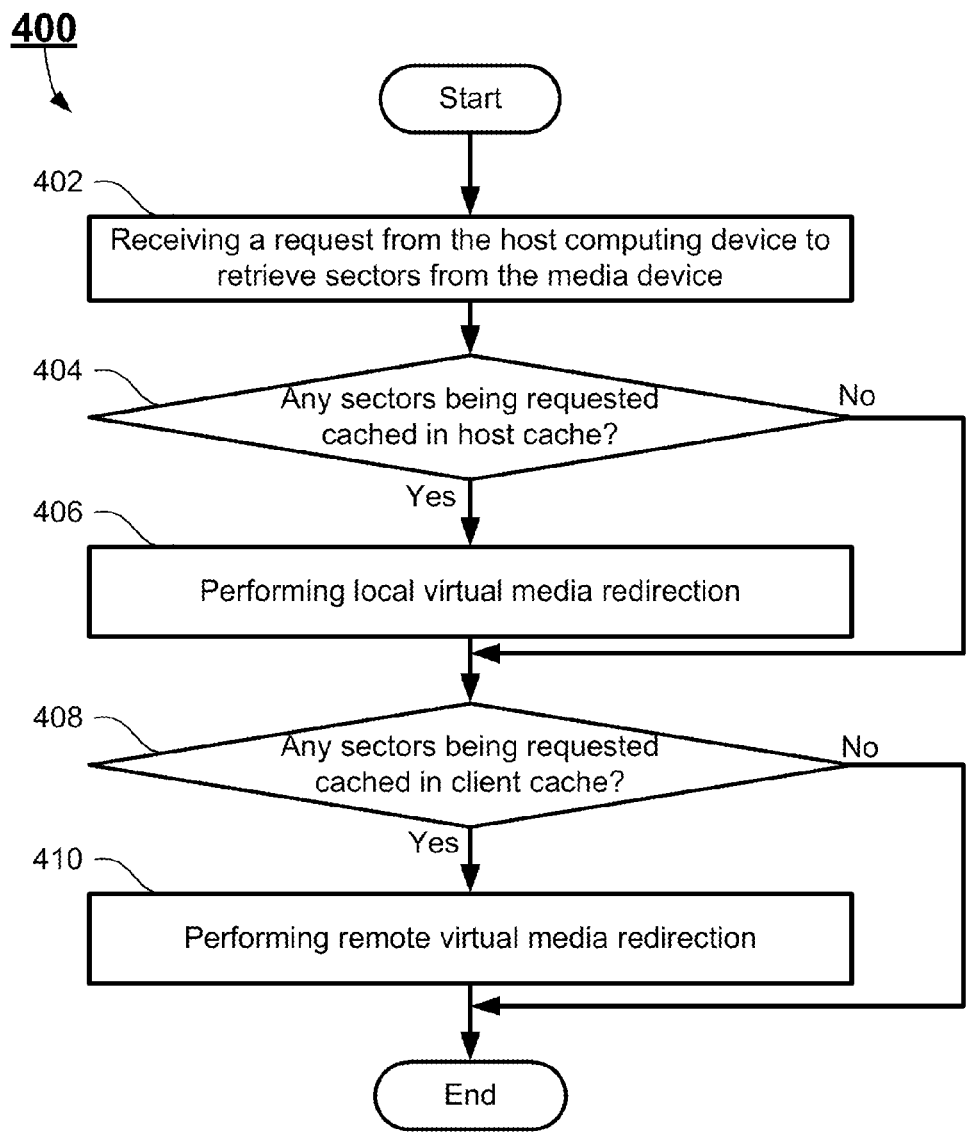
FIG. 4 depicts a flowchart of performing virtual media redirection according to certain embodiments of the present disclosure.

FIG. 4 shows a flowchart 400 of performing virtual media redirection according to certain embodiments of the present disclosure. This flowchart 400 implements the operations 310 and 312 of the flowchart 300 as shown in FIG. 3. In certain embodiments, the method may be performed in the system 100 as shown in FIG. 1. It should be noted that, although the flowchart shows the operation steps in a particular sequential order, it merely provides certain embodiments of the method. In certain embodiments, unless indicated otherwise in the present disclosure, the steps of the method may be implemented in any sequential orders.

At operation 402, the BMC 120 receives a virtual media redirection request from the host computing device 110 to retrieve sectors from the media device 170.

At operation 404, the BMC 120 checks and determines whether any of the sectors being requested is stored in the host cache 154. When one or more of the sectors being requested are stored in the host cache 154, the BMC 120 continues to operation 406. When none of the sectors being requested is stored in the host cache 154, the BMC 120 moves to operation 408.

At operation 406, the BMC 120 performs the local virtual media redirection. Specifically, the BMC 120 transmits the of the sectors being requested from the host cache 154 to the host computing device 110, and marks the sectors being transmitted in the host cache 154 as used sectors. In certain embodiments, the BMC 120 may discard the used sectors in the host cache 154, and store new data sectors from the media device 170 in the host cache 154 until the host cache 154 is full.

At operation 408, the BMC 120 checks and determines whether any of the sectors being requested is stored in the client cache 144. When one or more of the sectors being requested are stored in the client cache 144, the BMC 120 continues to operation 410. When none of the sectors being requested is stored in the client cache 144, the BMC 120 moves to exit the virtual media redirection process.

At operation 410, the BMC 120 performs the remote virtual media redirection. Specifically, the BMC 120 instructs the client computing device 130 to transmit the sectors being requested from the client cache 144 to the BMC 120 through the network 160. Upon receiving the sectors being requested from the client computing device 130, the BMC 120 sends the sectors received to the host computing device 110. Meanwhile, the client computing device 130 may mark the sectors being transmitted in the client cache 144 as used sectors. In certain embodiments, the BMC 120 may instruct the client computing device 130 to discard the used sectors in the client cache 144, and then store new data sectors from the media device 170 in the client cache 144 until the client cache 144 is full.

Figure 5:
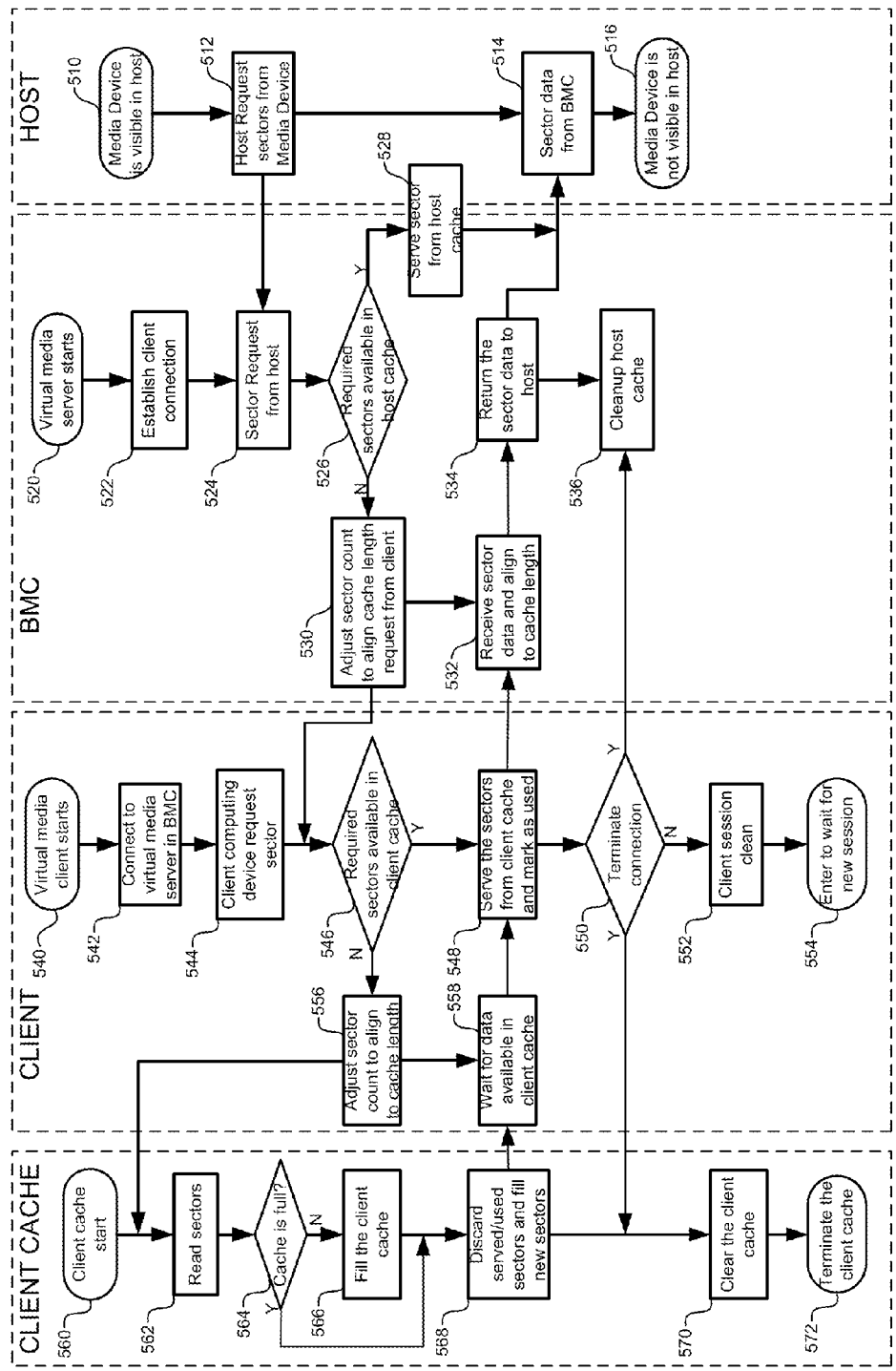
FIG. 5 illustrates a virtual media redirection process among the host computing device, the BMC, and the client computing devices according to certain embodiments of the present disclosure.

FIG. 5 illustrates a virtual media redirection process among the host computing device, the BMC, and the client computing devices according to certain embodiments of the present disclosure. As described earlier, the virtual media redirection process involves four major elements: the host computing device 110, the BMC 120, the client computing devices 130, as well as the client cache 144. In certain embodiments, the virtual media redirection process may be implemented by the system 100 as shown in FIG. 1.

At the host computing device 110, the operation 510 makes the media devices 170 visible in the host computing device 110. These media devices 170 may include compact disk (CD), digital video disc (DVD), solid state storage such as flash drives, and ISO images.

At operation 512, the host computing device 110 may request certain media sectors from the media device 170. At operation 514, the host computing device 110 receives sector data from the BMC 120. Optionally, in certain embodiments, at operation 516, the media device 170 may be made invisible to the host computing device 110.

At the BMC 120, the operation 520 starts a virtual media server operating on the BMC 120. At operation 522, the virtual media server establishes a virtual media client connection to the client computing device 130. At operation 524, the virtual media server receives sector request from the host computing device 110. Such request includes the sectors being requested.

At operation 526, the BMC 120 checks to see if any of the requested media sectors is available in a host cache 154. When the requested sectors are available in the host cache 154, the requested sectors are served from the host cache 154 to the host computing device 110 through operation 528. When a portion of the requested sectors is available in the host cache 154, the BMC 120 serves the requested sectors in the host cache 154 to the host computing device 110, and send sector request of the remaining requested sectors (the requested sectors not available in the host cache 154) to the client computing device 130 through operation 530. When the requested sectors are not available in the host cache 154, the BMC 120 sends sector request of the remaining requested sectors (the requested sectors not available in the host cache 154) to the client computing device 130 through operation 530.

At operation 530, the sector count is adjusted to align the host cache length request from client. At operation 532, the BMC 120 receives sector data from the client and the cache length is aligned. At operation 534, the received sector data from the client is sent to the host computing device 110. At operation 536, once the received sector date from the client is sent to the host computing device 110, the host cache 154 may be cleaned. When the BMC 120 receives client connection termination request from operation 550, the host cache 154 may be cleaned before the client connection is terminated.

At the client computing device 130, the operation 540 starts a virtual media client on the client computing device 130. At operation 542, the client computing device 1330 establishes a virtual media connection to the virtual media server in the BMC 120. At operation 544, the client computing device 130 may initiate a virtual media request to request the sectors.

At operation 546, the client computing device 130 receives request from either the host computing device 110 through the BMC 120, or the client computing device 130. The client computing device 130 checks and determines whether any of the requested sectors are available in the client cache 144. When one or more of the requested sectors are available in the client cache 144, the process proceeds to operation 548. When the requested sectors are not available in the client cache 144, the process proceeds to operation 556. At operation 548, the requested sectors in the client cache 144 are served to the requesters (either the client computing devices 130, or the host computing device 110).

At operation 550, the client computing devices 130 check and determines whether to terminate client connection from the client computing device 130 to the BMC 120. When client connection is to be terminated, the process proceeds to both operation 570, and operation 536. At the operation 536, the host cache 154 is cleaned up. At operation 570, the client cache 144 is cleaned up, and the client cache 144 is terminated at operation 572. When the client connection is not to be terminated, the process proceeds to operation 552.

At operation 552, the client session performs clean up, and updates the client cache 144. At operation 554, the client session waits for new another client session to start. At operation 556, the requested sectors (or a portion of the requested sector) are requested from the client computing device 130. The process proceeds to operation 562 to request the client cache 144 to the read the requested sectors.

At operation 558, on the other hand, the client computing devices 130 waits for the requested sectors to be available in the client cache 144. Once the requested sectors are available in the client cache 144, the process proceeds to operation 548 to serve the requested sectors to the requesters.

At the client cache 144, the operation 560 starts the client cache 144. At operation 562, at the request from the client computing device 130 via operation 556, the client cache 144 reads the requested sectors. At operation 564, the client cache 144 checks whether the client cache 144 is full. When the client cache 144 is not full, the process proceeds to operation 566 to fill the client cache 144 until the client cache 144 is full. When the client cache 144 is full, the process proceeds to operation 568.

At operation 566, the client cache 144 is filled until the client cache 144 is full. At operation 568, when the client cache 144 is full, the client cache 144 is cleaned. Some of the requested sectors already served or marked used will be discarded, and new sectors are filled. At operation 570, the client cache 144 receives request to terminate the client connection from operation 550, the client cache 144 is then cleared. At operation 572, the client connection is terminated.

In yet another aspect, the present disclosure relates to a non-transitory computer storage medium storing computer-executable code. When the computer-executable code is executed by a processor of a baseboard management controller (BMC), the executed code causes the processor to perform the method as described above. In certain embodiments, the computer-executable code may be at least a part of the BMC firmware 150 of the BMC 120, such as the virtual media redirection module 158 as described above. In certain embodiments, the non-transitory computer readable medium may include, but not limited to, the non-volatile memory 126 of the BMC 120 as described above, or any other storage media of the BMC 120.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a host computing device;
a baseboard management controller (BMC) communicatively connected to the host computing device through a communication interface, the BMC having a processor and a non-volatile memory, wherein the non-volatile memory stores a virtual media redirection module; and
a client computing device communicatively connected to the BMC through a network, the client computing device having a memory;
wherein the virtual media redirection module, when executed at the processor of the BMC, is configured to:
emulate a virtual media for a media device, wherein the media device stores data of one or more media files;
establish a virtual media connection to the client computing device through the network, wherein a client cache is created at the memory of the client computing device;
store the data from the media device in a host cache by sectors;
instruct the client computing device to store the data from the media device in the client cache by sectors;
receive a request from the host computing device through the communication interface to retrieve one or more sectors from the media device; and
in response to the request, perform a virtual media redirection to redirect the sectors being requested to the host computing device, wherein the virtual media redirection comprises:
performing a local virtual media redirection when one or more of the sectors being requested are stored in the host cache; and
performing a remote virtual media redirection when one or more of the sectors being requested are stored in the client cache.

2. The system as claimed in claim 1, wherein the communication interface is a universal serial bus (USB) interface.

3. The system as claimed in claim 1, wherein the virtual media redirection module, when executed at the processor of the BMC, is configured to store the data from the media device in the host cache by sectors by:
retrieving the sectors of the data from the media device; and
storing the retrieved sectors in the host cache until the host cache is full.

4. The system as claimed in claim 3, wherein the retrieved sectors from the media device comprises frequently requested sectors.

5. The system as claimed in claim 3, wherein the virtual media redirection module, when executed at the processor of the BMC, is configured to store the data from the media device in the host cache by sectors when the BMC is idling.

6. The system as claimed in claim 1, wherein the virtual media redirection module, when executed at the processor of the BMC, is configured to instruct the client computing device to store the data from the media device in the client cache by sectors by:
instructing the client computing device to retrieve the sectors of the data from the media device; and
instructing the client computing device to store the retrieved sectors in the client cache until the client cache is full.

7. The system as claimed in claim 6, wherein the retrieved sectors from the media device comprises frequently requested sectors.

8. The system as claimed in claim 1, wherein the host computing device is configured to:
receive a command to retrieve one or more of the media files from the media device;
determine the sectors corresponding to the one or more of the media files to be retrieved; and
generate the request to retrieve the sectors, and send the request to the BMC.

9. The system as claimed in claim 1, wherein the virtual media redirection module, when executed at the processor of the BMC, is configured to perform the local virtual media redirection by:
determining, at the BMC, whether any of the sectors being requested is stored in the host cache;
in response to determining that one or more of the sectors being requested are stored in the host cache, transmitting the one or more of the sectors being requested from the host cache to the host computing device; and
marking the one or more of the sectors being transmitted in the host cache as used sectors.

10. The system as claimed in claim 9, wherein the virtual media redirection module, when executed at the processor of the BMC, is further configured to:
discard the used sectors in the host cache; and
store the data from the media device in the host cache by sectors until the host cache is full.

11. The system as claimed in claim 1, wherein the virtual media redirection module, when executed at the processor of the BMC, is configured to perform the remote virtual media redirection by:
determining, at the BMC, whether any of the sectors being requested is stored in the client cache;
in response to determining that one or more of the sectors being requested are stored in the client cache, instructing the client computing device to transmit the one or more of the sectors being requested from the client cache to the BMC through the network; and
receiving the sectors being transmitted from the client computing device, and sending the sectors received to the host computing device;

wherein the client computing device is configured to mark the one or more of the sectors being transmitted in the client cache as used sectors.

12. The system as claimed in claim 11, wherein the virtual media redirection module, when executed at the processor of the BMC, is further configured to instruct the client computing device to:
   discard the used sectors in the client cache; and
   store the data from the media device in the client cache by sectors until the client cache is full.

13. A method of performing virtual media redirection, comprising:
   emulating, by a baseboard management controller (BMC), a virtual media for a media device, wherein the media device stores data of one or more media files;
   establishing, by the BMC, a virtual media connection to a client computing device through a network, wherein the client computing device is communicatively connected to the BMC through the network, and a client cache is created at a memory of the client computing device;
   storing, at the BMC, the data from the media device in a host cache by sectors;
   instructing, by the BMC, the client computing device to store the data from the media device in the client cache by sectors;
   receiving, at the BMC, a request from a host computing device through a communication interface to retrieve one or more sectors from the media device; and
   in response to the request, performing, at the BMC, a virtual media redirection to redirect the sectors being requested to the host computing device, wherein the virtual media redirection comprises:
      performing a local virtual media redirection when one or more of the sectors being requested are stored in the host cache; and
      performing a remote virtual media redirection when one or more of the sectors being requested are stored in the client cache.

14. The method as claimed in claim 13, wherein the communication interface is a universal serial bus (USB) interface.

15. The method as claimed in claim 13, wherein the BMC is configured to store the data from the media device in the host cache by sectors by:
   retrieving the sectors of the data from the media device; and
   storing the retrieved sectors in the host cache until the host cache is full,
   wherein the retrieved sectors from the media device comprises frequently requested sectors.

16. The method as claimed in claim 15, wherein the BMC is configured to store the data from the media device in the host cache by sectors when the BMC is idling.

17. The method as claimed in claim 13, wherein the BMC is configured to instruct the client computing device to store the data from the media device in the client cache by sectors by:
   instructing the client computing device to retrieve the sectors of the data from the media device; and
   instructing the client computing device to store the retrieved sectors in the client cache until the client cache is full,
   wherein the retrieved sectors from the media device comprises frequently requested sectors.

18. The method as claimed in claim 13, wherein the local virtual media redirection is performed by:
   determining, at the BMC, whether any of the sectors being requested is stored in the host cache;
   in response to determining that one or more of the sectors being requested are stored in the host cache, transmitting the one or more of the sectors being requested from the host cache to the host computing device;
   marking the one or more of the sectors being transmitted in the host cache as used sectors;
   discarding the used sectors in the host cache; and
   storing the data from the media device in the host cache by sectors until the host cache is full.

19. The method as claimed in claim 13, wherein the remote virtual media redirection is performed by:
   determining, at the BMC, whether any of the sectors being requested is stored in the client cache;
   in response to determining that one or more of the sectors being requested are stored in the client cache, instructing the client computing device to transmit the one or more of the sectors being requested from the client cache to the BMC through the network;
   receiving the sectors being transmitted from the client computing device, and sending the sectors received to the host computing device, wherein the client computing device is configured to mark the one or more of the sectors being transmitted in the client cache as used sectors;
   instructing the client computing device to discard the used sectors in the client cache; and
   instructing the client computing device to store the data from the media device in the client cache by sectors until the client cache is full.

20. A non-transitory computer storage medium having computer-executable code stored thereon, wherein the computer-executable code, when executed by a processor of a baseboard management controller (BMC), causes the processor to:
   emulate a virtual media for a media device, wherein the media device stores data of one or more media files;
   establish a virtual media connection to a client computing device through a network, wherein the client computing device is communicatively connected to the BMC through the network, and a client cache is created at the memory of the client computing device;
   store the data from the media device in a host cache by sectors;
   instruct the client computing device to store the data from the media device in the client cache by sectors;
   receive a request from a host computing device through a communication interface to retrieve one or more sectors from the media device; and
   in response to the request, perform a virtual media redirection to redirect the sectors being requested to the host computing device, wherein the virtual media redirection comprises:
      performing a local virtual media redirection when one or more of the sectors being requested are stored in the host cache; and
      performing a remote virtual media redirection when one or more of the sectors being requested are stored in the client cache.

21. The non-transitory computer storage medium as claimed in claim 20, wherein the communication interface is a universal serial bus (USB) interface.

22. The non-transitory computer storage medium as claimed in claim 20, wherein the computer-executable code, when executed by the processor, causes the processor to store the data from the media device in the host cache by sectors by:
retrieving the sectors of the data from the media device; and
storing the retrieved sectors in the host cache until the host cache is full,
wherein the retrieved sectors from the media device comprises frequently requested sectors.

23. The non-transitory computer storage medium as claimed in claim 22, wherein the computer-executable code, when executed by the processor, causes the processor to store the data from the media device in the host cache by sectors when the BMC is idling.

24. The non-transitory computer storage medium as claimed in claim 20, wherein the computer-executable code, when executed by the processor, causes the processor to instruct the client computing device to store the data from the media device in the client cache by sectors by:
instructing the client computing device to retrieve the sectors of the data from the media device; and
instructing the client computing device to store the retrieved sectors in the client cache until the client cache is full,
wherein the retrieved sectors from the media device comprises frequently requested sectors.

25. The non-transitory computer storage medium as claimed in claim 20, wherein the computer-executable code, when executed by the processor, causes the processor to perform the local virtual media redirection by:
determining, at the BMC, whether any of the sectors being requested is stored in the host cache;
in response to determining that one or more of the sectors being requested are stored in the host cache, transmitting the one or more of the sectors being requested from the host cache to the host computing device;
marking the one or more of the sectors being transmitted in the host cache as used sectors;
discarding the used sectors in the host cache; and
storing the data from the media device in the host cache by sectors until the host cache is full.

26. The non-transitory computer storage medium as claimed in claim 20, wherein the computer-executable code, when executed by the processor, causes the processor to perform the remote virtual media redirection by:
determining, at the BMC, whether any of the sectors being requested is stored in the client cache;
in response to determining that one or more of the sectors being requested are stored in the client cache, instructing the client computing device to transmit the one or more of the sectors being requested from the client cache to the BMC through the network;
receiving the sectors being transmitted from the client computing device, and sending the sectors received to the host computing device, wherein the client computing device is configured to mark the one or more of the sectors being transmitted in the client cache as used sectors;
instructing the client computing device to discard the used sectors in the client cache; and
instructing the client computing device to store the data from the media device in the client cache by sectors until the client cache is full.

* * * * *